(12) United States Patent
Kameyama

(10) Patent No.: US 7,977,584 B2
(45) Date of Patent: Jul. 12, 2011

(54) ELECTRIC APPARATUS MODULE

(75) Inventor: Isao Kameyama, Susono (JP)

(73) Assignee: Yazaki Corporation, Tokyo (JP)

( * ) Notice: Subject to any disclaimer, the term of this patent is extended or adjusted under 35 U.S.C. 154(b) by 277 days.

(21) Appl. No.: 12/429,306

(22) Filed: Apr. 24, 2009

(65) Prior Publication Data
US 2009/0266606 A1    Oct. 29, 2009

(30) Foreign Application Priority Data

Apr. 25, 2008  (JP) ................................. 2008-115505

(51) Int. Cl.
*H01R 13/502* (2006.01)
(52) U.S. Cl. ........................................ 174/561; 396/535
(58) Field of Classification Search .................. 396/535; 174/174, 559, 560; 361/752
See application file for complete search history.

(56) References Cited

U.S. PATENT DOCUMENTS

| | | | | |
|---|---|---|---|---|
| 5,214,245 A * | 5/1993 | Bernhardt et al. | ............ | 174/560 |
| 5,393,931 A * | 2/1995 | Guenther | ...................... | 174/547 |
| 6,072,697 A * | 6/2000 | Garcia-Ortiz | ................ | 361/704 |
| 6,211,457 B1 * | 4/2001 | Cama et al. | .................... | 174/380 |
| 6,287,021 B1 * | 9/2001 | Katoh et al. | .................. | 396/348 |
| 6,456,497 B1 * | 9/2002 | Palmer | .......................... | 361/752 |
| 6,734,419 B1 * | 5/2004 | Glenn et al. | .................. | 250/239 |
| 2006/0289204 A1 * | 12/2006 | Twitchell et al. | ............. | 174/480 |

FOREIGN PATENT DOCUMENTS

JP       2007-35376 A      2/2007

* cited by examiner

*Primary Examiner* — Hung V Ngo
(74) *Attorney, Agent, or Firm* — Sughrue Mion, PLLC

(57) ABSTRACT

The invention provides an electric apparatus unit which can be easily assembled. The electric apparatus module includes an upper case, a lower case assembled with the upper case and having an opening, an electric apparatus unit accommodated in the upper case and the lower case, a connection unit including a board, a connector mounted on the board and connected to the electric apparatus unit, and a connecting member, a first end of the connecting member attached to the board and a second end of the connecting member guided to outside of the lower case through the opening, and an assembling portion provided on the connection unit and the lower case and assembling the connection unit to the lower case, the assembling portion enabling the board to move along surficial direction of the board and restricting the board to move in a direction perpendicular to the surface of the board.

9 Claims, 4 Drawing Sheets

ELECTRIC APPARATUS MODULE

BACKGROUND

This invention relates to an electric apparatus module on which an electric apparatus unit is mounted.

An electric apparatus module having a case in which a camera module is accommodated is used. The camera module is attached, as an electric apparatus unit, to such as an upper portion of rear side of a vehicle (moving body). The electric apparatus module includes an upper case, a lower case which is assembled with the upper case and receives, together with the upper case, the camera module (electric apparatus unit) therebetween, the camera module, and a connection unit for connecting the camera module to an external apparatus.

The camera module is mounted on the upper case. The connection unit includes a connector (hereinafter referred to as "external apparatus-connecting connector) for connection to the external apparatus which connector is mounted on the lower case, a connector hereinafter referred to as "camera module-connecting connector) for connection to the camera module, and an FPC having opposite ends connected respectively to the two connectors to electrically connect these connectors. The external apparatus-connecting connector is mounted on the lower case.

For assembling the electric apparatus module, the camera module is mounted on the upper case, and the external apparatus-connecting connector is mounted on the lower case, and the camera module-connecting connector is mounted on the camera module while bending the FPC, and the upper and lower cases are assembled, thus completing the assembling operation. A connector of a wire harness mounted on the automobile is connected to the external apparatus-connecting connector of the thus assembled electric apparatus module, and the lower case is mounted, for example, on an upper portion of the rear side of a vehicle body of the automobile. The camera module of the electric apparatus module is connected via the wire harness to a monitor mounted, for example, on an instrument panel, and an image picked up by the camera module is displayed on the monitor.

In the above electric apparatus module, the camera module is mounted on the upper case, and the external apparatus-connecting connector is mounted on the lower case, and then the camera module-connecting connector is mounted on the camera module while bending the FPC, and in order to smoothly effect these mounting operations, the FPC need to have a length larger than a length required for connecting the two connectors together. Therefore, the FPC has often been caught between the upper and lower cases at the time of assembling the upper and lower cases together, and therefore it has been difficult to smoothly effect the assembling operation.

It is therefore an object of this invention to provide an electric apparatus module which can be easily assembled.

SUMMARY

The first aspect of the invention devised in order to solve the above mentioned problem is an electric apparatus module includes an upper case, a lower case assembled with the upper case and having an opening, an electric apparatus unit accommodated in the upper case and the lower case, a connection unit including a board, a connector mounted on the board and connected to the electric apparatus unit, and a connecting member, a first end of the connecting member attached to the board and a second end of the connecting member guided to outside of the lower case through the opening, and an assembling portion provided on the connection unit and the lower case and assembling the connection unit to the lower case, the assembling portion enabling the board to move along surficial direction of the board and restricting the board to move in a direction perpendicular to the surface of the board.

The second aspect of the invention according to the first aspect is the electric apparatus module includes the assembling portion includes a through hole provided on the board and a boss provided on the lower case and including a detent which is engaged with the board, a holding portion coming into intimate contact with the board and sandwiching the board with the detent and a small diameter portion provided between the detent and the clipping portion and having a diameter smaller than the diameter of the through hole.

The third aspect of the invention according the first and the second aspect is the electric apparatus module includes the connecting member which has a deformable portion provided between the first end and the second end of the connecting member.

The forth aspect of the invention according to the first and the third aspect is the electric apparatus module includes the lower case is filled with a potting material so as to prevent a liquid from intruding into the upper case and the lower case.

According to the first aspect of the invention, the assembling portion allows the circuit board (and hence the connector) to move in the surficial direction of the circuit board. Therefore, the electric apparatus unit is mounted on the upper case, and the board is mounted on the lower case, and the upper and lower cases are coupled together, and in this assembling operation the connector can be suitably moved, so that the connector can be connected to the electric apparatus unit.

And besides, the assembling portion prevents the circuit board (and hence the connector) from movement in the direction perpendicular to the surface of this board. Therefore, after the upper and lower cases are assembled together, the circuit board is prevented from being displaced out of position.

According to the second aspect of the invention, the boss portion includes the detent and the holding portion between which the circuit board is sandwiched. Therefore, the assembling portion can positively prevent the board from movement in the direction of the thickness of this board.

The boss portion further includes the small diameter portion has a small diameter than that of through hole. When assembled, the small diameter portion is spaced from the inner peripheral surface of the through hole of the assembling portion. Therefore, the assembling portion can positively allow the circuit board (and hence the connector) to move in the surficial direction of the circuit board.

According to the third aspect of the invention, the connecting member includes the deformable portion. Therefore, even if the connector moves in the surficial direction of the circuit board at the time of connecting the connector to the electric apparatus unit, the deformable portion can be suitably deformed, thereby preventing a load from acting on the portion where the connecting member is connected to the connector.

According to the fourth aspect of the invention, the potting material filled in the lower case prevents a liquid from intruding into the interior of the coupled upper and lower cases from the exterior. Therefore, water is prevented from intruding into the interior of the coupled cases.

As described above, according to the first aspect of the invention, the upper and lower cases having the electric apparatus unit and the circuit board mounted thereon are assembled together, and by doing so, the connector can be suitably moved, so that the connector can be connected to the electric apparatus unit. Therefore, the electric apparatus unit can be easily connected to the external apparatus, and therefore the electric apparatus module can be easily assembled.

Furthermore, after the upper and lower cases are coupled together, the circuit board is prevented from being displaced. Therefore, the electric apparatus unit can be positively kept connected to the external apparatus.

According to the second aspect of the invention, the assembling portion can positively prevent the board (and hence the connector) from movement in the direction perpendicular to the surface of the board, and therefore the connector can be positively prevented from being disengaged from the electric apparatus unit.

Furthermore, the assembling portion positively allows the circuit board (and hence the connector) from movement in the surficial direction of this board, and therefore the electric apparatus unit can be positively and easily connected to the external apparatus.

According to the third aspect of the invention, a load is prevented from acting on the portion where the connecting member is connected to the connector, and therefore the connection between the connector and the connecting member is prevented from becoming unstable, and of course, the connection between the connector and the connecting member is prevented from being broken.

According to the fourth aspect of the invention, water is prevented from intruding into the interior of the coupled upper and lower cases, and therefore the electric apparatus unit is prevented from a malfunction.

EMBODIMENTS

Figure 1:
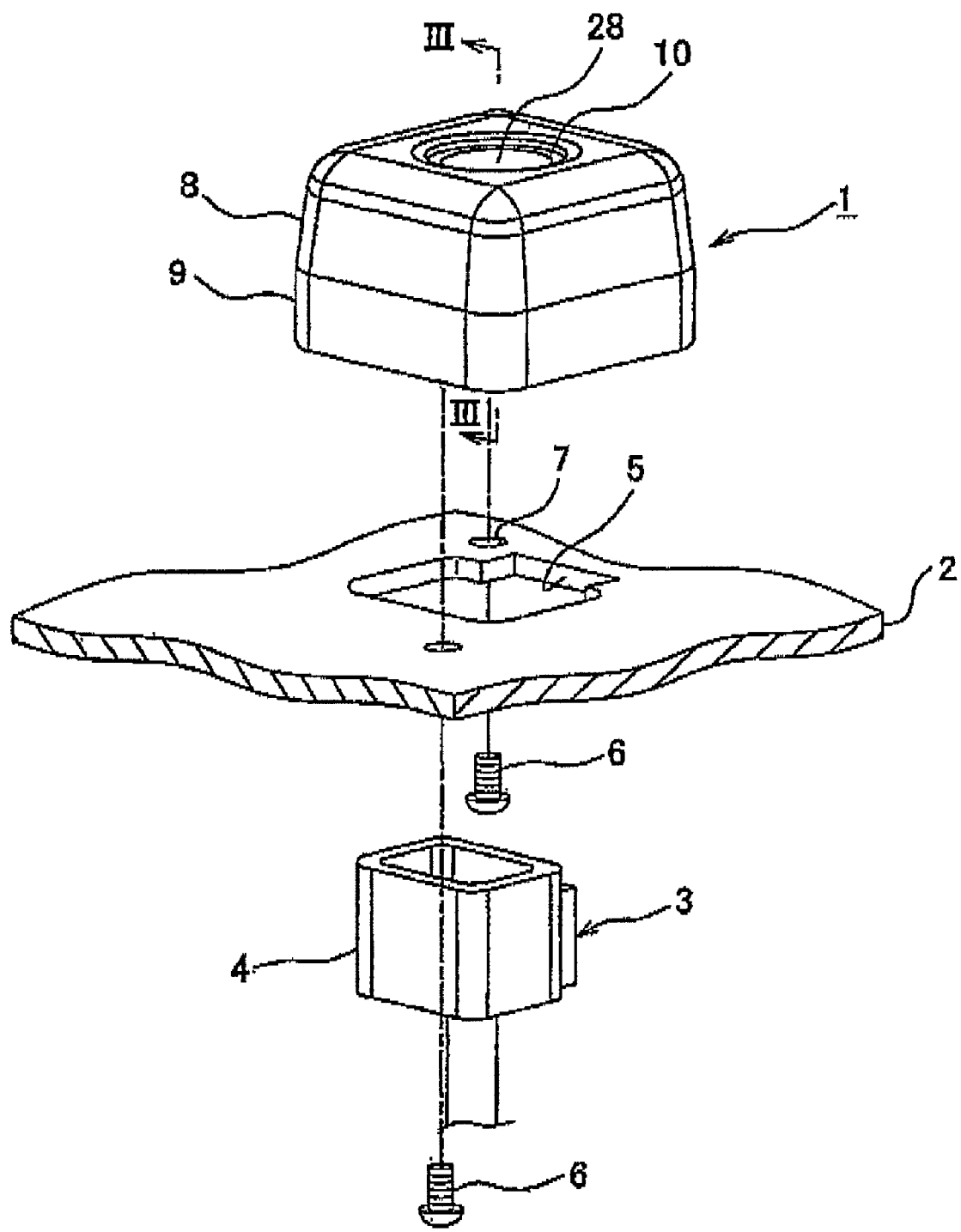
FIG. 1 is a perspective view showing one preferred embodiment of an electric apparatus module of the present invention and associated members.

First embodiment of an electric apparatus module of the present invention will now be described with reference to FIGS. 1 to 4. The electric apparatus module 1 shown in the drawings is mounted on an upper portion of a rear side (for example, a rear panel 2) of a vehicle.

The rear panel 2 is part of a body of the vehicle, and is made of sheet metal or the like. As shown in FIG. 1, a hole 5 for the passage of a connector 4 (provided at an end portion of a wire harness 3 installed in the vehicle) is formed through the rear panel 2, and also holes 7 each for the passage of a screw 6 are formed through the rear panel 2. The wire harness 3 is connected to a monitor device (external apparatus) (not shown) mounted on an instrument panel of the vehicle.

Figure 2:
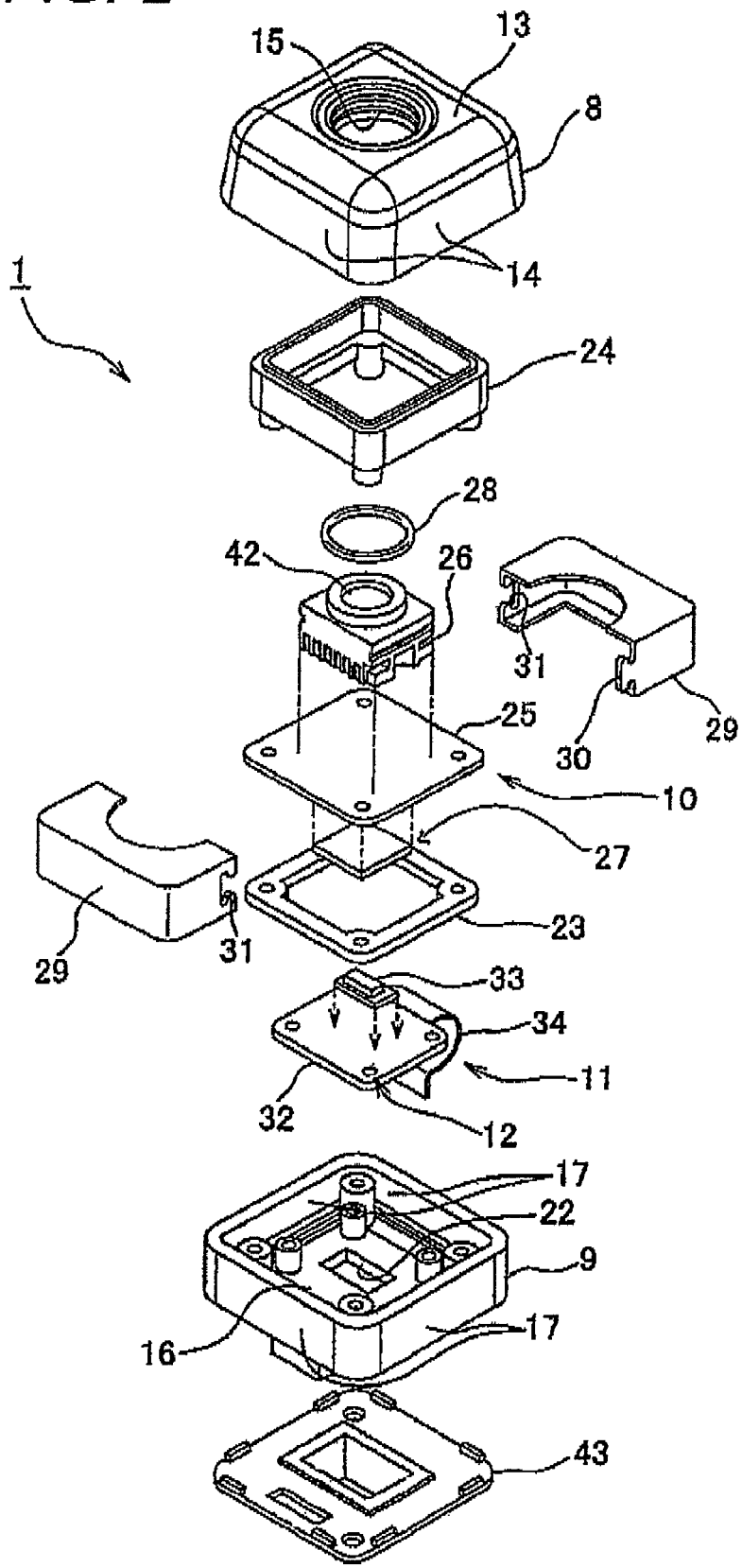
FIG. 2 is an exploded perspective view of the electric apparatus module of FIG. 1.
Figure 3:
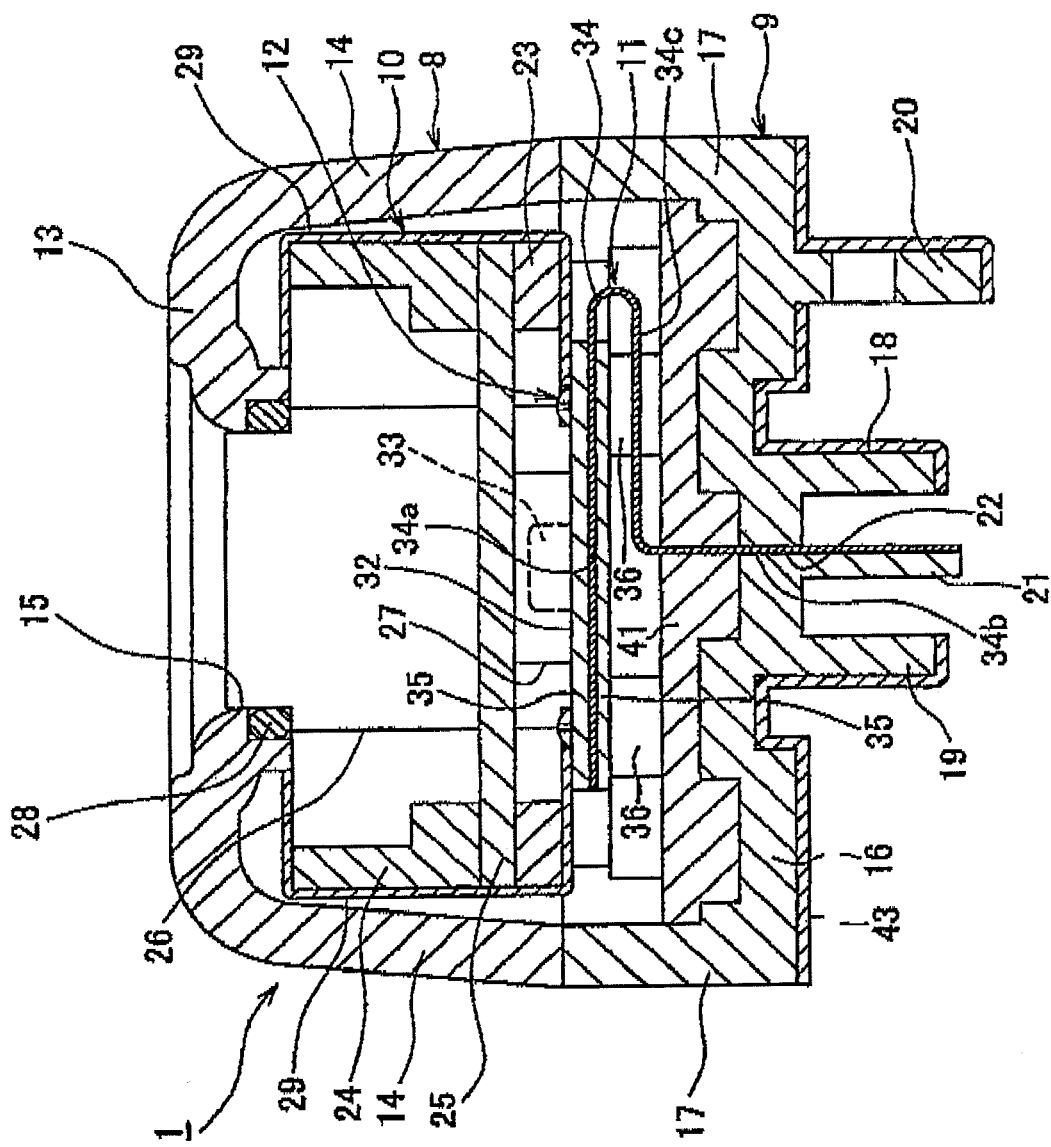
FIG. 3 is a cross-sectional view taken along the line III-III of FIG. 1.

As shown in FIGS. 2 and 3, the electric apparatus module 1 includes an upper case 8, a lower case 9, a camera unit 10 serving as an electric apparatus unit, a connection unit 11, and assembling portions 12 (shown in FIG. 3).

The upper case 8 is made of metal, and includes a top wall 13, and a peripheral wall 14 extending downwardly from a peripheral edge of the top wall 13. A round hole 15 is formed through the top wall 13.

The lower case 9 is made of metal, and includes a bottom wall 16, and a peripheral wall 17 extending upwardly from a peripheral edge of the bottom wall 16. A tubular connector portion 18 for fitting to the connector 4 is formed on the bottom wall 16, and also screw holes (not shown) are formed through the bottom wall 16. The connector portion 18 includes a tubular portion 19 extending downwardly from the bottom wall 16, a lock arm 20 for engagement with the connector 4, and an upstanding plate portion 21 provided within the tubular portion 19 and extending downwardly from the bottom wall 16. The connector 4 is inserted into the interior of the tubular portion 19. The lock arm 20 is engaged with a lock projection (not shown) of the connector 4. The upstanding plate portion 21 is connected to female terminals of the connector 4. The screws 6 are threaded respectively into the screw holes formed through the bottom wall 16.

A hole 22 is formed through the bottom wall 16, and is open to the interior of the tubular portion 19. An edge of the hole 22 is disposed flush with the surface of the upstanding plate portion 21.

The upper and lower cases 8 and 9 are coupled together with the edges of their peripheral walls 14 and 17 held against each other.

The camera unit 10 includes a frame member 23, a shell frame 24, a printed wiring board 25, a CCD camera 26, a CCD connector 27, an O-ring 28, and a pair of shield shells 29.

The frame member 23 is formed into a frame-shape (In the illustrated embodiment, its outer peripheral edge has a rectangular frame-shape when viewed from the upper side.). The shell frame 24 is has a frame-shape, and is generally equal in size to the frame member 23 when viewed from the upper side. The shell frame 24 is stacked on the frame member 23 with space between the sell frame 24 and the frame member 23. The printed wiring board 25 has a rectangular shape, and its outer peripheral edge is generally equal in size to the outer peripheral edge of the frame member 23 and the outer periphery of the shell frame 24 when viewed from the upper side. The printed wiring board 25 is held between the frame member 23 and the frame shell 24. The printed wiring board 25 electrically connects the CCD camera 26 to the CCD connector 27.

The CCD camera 26 is mounted on an upper surface of the printed wiring board 25 opposed to the top wall 13 of the upper case 8. The CCD camera 26 has a lens 42 fitted in the round hole 15. The CCD camera 26 picks up images outside the upper case 8 through the lens 42.

The CCD connector 27 is mounted on a lower surface of the printed wiring board 25 opposed to the bottom wall 16 of the lower case 9. The O-ring is made of an elastic synthetic resin, and is formed into a ring-shape. The O-ring 28 is disposed between the outer periphery of the lens 42 of the CCD camera 26 and the inner periphery of the round hole 15 in the top wall 13. The O-ring 28 forms a watertight seal between the outer periphery of the lens 42 and the inner periphery of the round hole 15, thereby preventing a liquid such as water from intruding into the interior of the upper case 8.

Each of the pair of shield shells 29 is formed by bending an electrically-conductive metal sheet or the like, and includes an engagement portion 30 and a reception portion 31. The engagement portion 30 and the reception portion 31 of one of the two shield shells 29 are engaged respectively with the reception portion 31 and the engagement portion 39 of the other shield shell 29, thereby fixing the two shield shells 29 to each other. The pair of shield shells 29, when fixed to each other, jointly assume a frame-shape, and cover the frame member 23, the printed wiring board 25, the CCD camera 26, the CCD connector 27 and the shell frame 24.

For assembling the camera unit 10, the frame member 23, the printed wiring board 25 having the CCD camera 26 and the CCD connector 27 mounted thereon, and the shell frame 24 are stacked together in this sequence, and then the pair of shield shells 29 are provided to cover this stack, thus assembling the camera unit 10. Thereafter, the O-ring 28 is mounted on the outer periphery of the lens 24 of the CCD camera 26, and then the camera unit 10 is mounted on the upper case 8.

The connection unit 11 comprises a board 32, a connector 33, and a FPC (flexible printed circuit) 34 serving as a connecting member. The board 32 comprises a pair of upper and lower printed wiring boards 35 stacked together in spaced relation to each other. One end portion 34a of the FPC 34 is held between the pair of printed wiring boards 35.

The connector 33 is mounted on an upper surface of the upper printed wiring board 35 opposed to the top wall 13 of the upper case 8. The connector 33 is adapted to be connected to the connector 27.

The FPC 34 includes a pair of insulative films (each made of a synthetic resin such as polyimide), and wire-like conductors (each made of a copper alloy or the like) held between the pair of insulative films. The FPC 34 has flexibility as a whole. The FPC 34 is secured to the board 32, with its one end portion 34a held between the pair of printed wiring boards 35, and the conductors of the FPC 34 are electrically connected to the connector 33. The other end portion 34b of the FPC 34 passes through the hole 22, and extends outwardly from the lower case 9, and is secured to the upstanding plate portion 21 in superposed relation thereto.

The insulative film is removed partly from the other end portion 34b of the FPC 34, thereby exposing the conductors. The FPC 34 (and hence the connection unit 11) is adapted to be electrically connected to the monitor device via the connector 4 (fitted to the connector portion 18) and the wire harness 3.

Since the FPC 34 itself has flexibility, its central portion 34c lying between the one end portion 34a and the other end portion 34b can be deformed, and therefore serves as a deformable portion.

Figure 4:
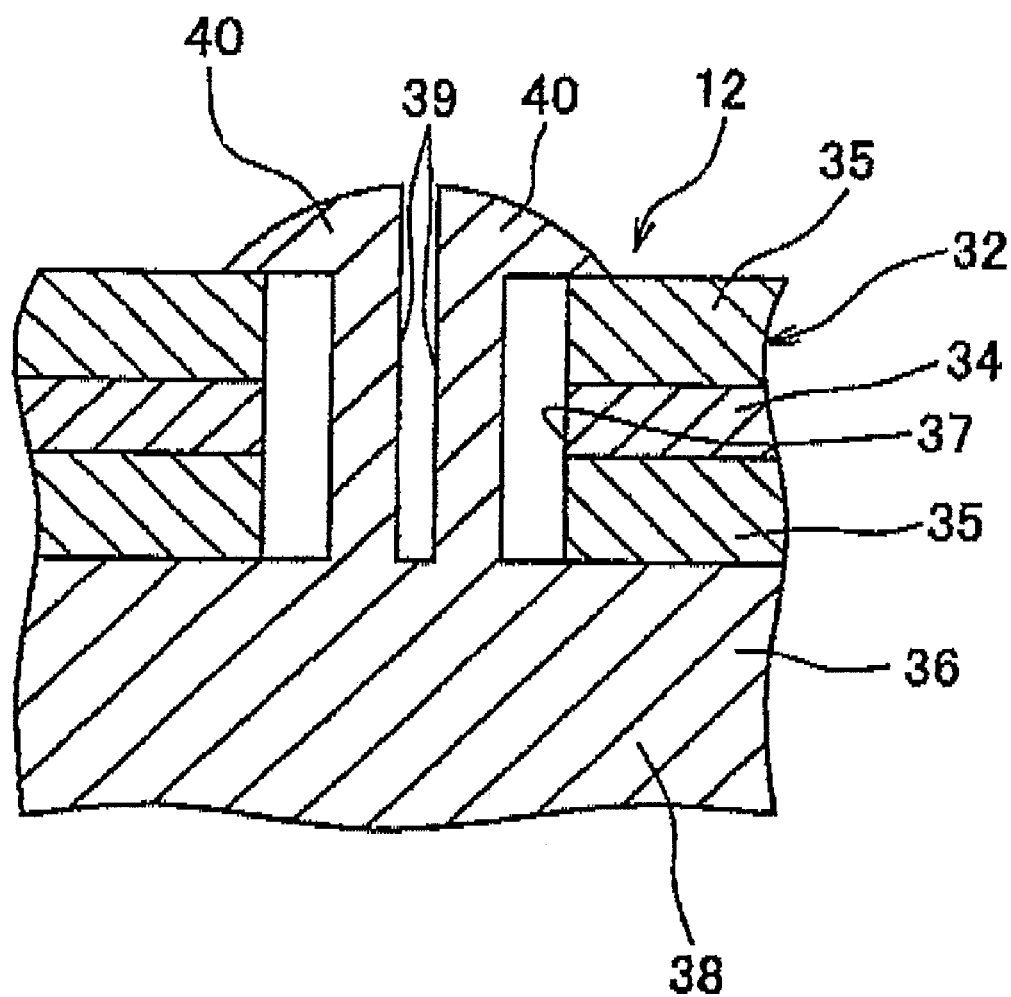
FIG. 4 is a cross-sectional view showing a assembling portion of FIG. 3 on an enlarged scale.

As shown in FIG. 4, each of the assembling portions 12 includes a boss portion 36 formed on and extending upright from the bottom wall 16 of the lower case 9, and a through hole 37 formed through the board 32. As shown in FIG. 4, the boss portion 36 includes a holding portion 38 of a cylindrical shape formed on and extending upright from the bottom wall 16, a pair of small diameter portions 39 (each having a generally semi-circular transverse cross-section) formed integrally with and extending upright from the holding portion 38, and a pair of detents 40 formed integrally respectively at distal ends of the small diameter portions 39. It should be notified that the form of the small diameter portion is not limited to the above described pair form. The boss portion 36 has a slit provided through the detent, or the detent and the small diameter portion so as to deform the boss portion 36 in order to go through the through hole 37.

The pair of small diameter portions 39 are disposed in parallel, spaced relation to each other. The pair of small diameter portions 39 are passed through the through hole 37. When the pair of small diameter portions 39 are passed through the through hole 37, their outer peripheral surfaces are spaced from an inner peripheral surface of the through hole 37. Thus, each small diameter portion 39 lies between the holding portion 38 and the corresponding detent 40, and the pair of small diameter portions 39 are smaller in size, that is, in transverse cross-section than the through hole 37, and therefore are spaced from the inner peripheral surface of the through hole 37. The detents 40 are formed at the distal ends of the small diameter portions 39, that is, at the distal end of the boss portion 36, and are passed through the through hole 37 to be retainingly engaged with the upper surface of the upper printed wiring board 35 (having the connector 33 mounted thereon) in closely-contacting relation thereto. Each of the through holes 37 extends through the board 32, and has an inner diameter larger than the combined outer diameter of the pair of small diameter portions 39.

The boss portion 36 of each assembling portion 12 is press-fitted into the corresponding through hole 37, with the pair of detents thereof 40 first introduced into the through hole 37. At this time, the pair of small diameter portions 39 are once elastically deformed to move the pair of detents 40 toward each other, and then the pair of detents 40, when passed through the through hole 39, are brought into close contact with the surface of the upper printed wiring board 35 because of an elastic restoring force of the small diameter portions 39. At the same time, the board 32 is superposed on the holding portions 38 of the boss portions 36 in closely-contacting relation thereto. Thus, the board 32 is held between each boss portion 36 (more specifically, the holding portion 38) and the corresponding detents 40. As a result, the pair of small diameter portions 39 of each assembling portion 12 are spaced radially from the inner peripheral surface of the through hole 37. In this manner, the board 32 of the connection unit 11 is mounted on the lower case 9 through the assembling portions 12.

The boss portion 36 and the pair of detents 40 of each assembling portion 12 are held in close contact with the board 32, thereby preventing the board 32 from movement relative to the lower case 9 in a direction of perpendicular to the surface of the board 32. Furthermore, the pair of small diameter portions 39 of each assembling portion 12 are disposed with space between the inner peripheral surface of the through hole 37, thereby allowing the board 32 to move relative to the lower case 9 in a surficial direction of the board 32. Thus, each assembling portions 12 including the boss portion 36 and the through hole 37 is provided at the lower case 9 and the board 32, and the board 32 is mounted on the lower case 9 through the assembling portions 12.

In the above electric apparatus module 1, a potting material 41 in a liquid state is filled in the lower case 9, and then is allowed to be cured. The potting material 41 includes, for example, silicone. Preferably, this silicone is room temperature curing silicone rubber having thixotropy. Here, the term "thixotropy" means that silicone rubber not yet cured is rendered into a liquid state (i.e., into a highly-flowable state) when subjected to vibration or the like of more than a predetermined level, and remains in a solid state (i.e., in a less flowable state than the above liquid state) in a stationary condition.

The potting material 41 has thixotropy, and therefore this potting material 41 in the liquid state can positively intrude into those regions requiring watertight, and then the potting material 41 thus introduced into these regions are solidified, and remain there. Therefore, these regions can be positively kept watertight. And besides, since the potting material 41 is of the room temperature curing type, it is not necessary to heat the potting material 41 for curing purposes. Therefore, the production process can be simplified, and also the need for providing a heating apparatus is obviated, thus preventing the production facilities from increasing. The potting material 41 prevents a liquid from intruding into the interior of the coupled upper and lower cases 8 and 9 through the hole 22.

The electric apparatus module 1 further includes a flat plate-like electrically-conductive ground shell 43 mated with the bottom wall 16 of the lower case 9.

The electric apparatus module 1 of the above construction is assembled in the following manner. First, the camera unit 10 is mounted on the upper case 8. Then, the other end portion 34b of the FPC 34 is passed through the hole 22, and is mated with the upstanding plate portion 21, and is secured to this upstanding plate portion 21, and the board 32 is mounted on the lower case 9 by the assembling portions 12. Thereafter, the potting material 41 in the liquid state is filled in the lower case 9, and is allowed to be cured. Thus, the connection unit 11 is mounted on the lower case 9.

The upper and lower cases 8 and 9 are coupled together while fitting the connector 33 of the connection unit 11 in the CCD connector 27 of the camera unit 10. At this time, the assembling portions 12 allow the board 32 of the connection unit 11 to move in the direction perpendicular to the axis of the board 32, and therefore the board 32 of the connection unit 11 moves in accordance with the positions of the connectors 27 and 33. Then, the ground shell 43 is mated with the lower case 9, and the screws 6 passing respectively through the holes 7 in the rear panel 2 are threaded respectively into the screw holes, thereby mounting the electric apparatus module 1 on the rear panel 2 of the automobile.

In this embodiment, the assembling portions 12 allow the board 32 to move in the direction perpendicular to the axis of this board 32. Therefore, the camera unit 10 is mounted on the upper case 8, and the board 32 is mounted on the lower case 9, and the upper and lower cases 8 and 9 are coupled together, and in this assembling operation, the connector 33 can be suitably moved, and can be connected to the camera unit 10. Therefore, the camera unit 10 can be easily connected to the monitor device, and therefore the electric apparatus module 1 can be easily assembled.

Furthermore, the assembling portions 12 prevent the board 32 from movement in the direction perpendicular to the surface of the board 32, and therefore after the upper and lower cases 8 and 9 are assembled, the board 32 is prevented from being displaced. Therefore, the connector 33 is prevented from being disengaged from the camera unit 10, and the camera unit 10 can be positively kept connected to the monitor device.

Each of the boss portions 36 includes the pair of detents 40 and the holding portion 38 between which the board 32 is held. Therefore, the assembling portions 12 can positively prevent the board 32 from movement in the direction of the thickness of this board 32. Therefore, the connector 33 is positively prevented from being disengaged from the camera unit 10.

Furthermore, the boss portion 36 of each assembling portion 12 includes the pair of small diameter portions 39 spaced from the inner peripheral wall of the through hole 37. Therefore, the assembling portions 12 can positively allow the board 32 (and hence the connector 33) to move in the surficial direction of the board 32. Therefore, the camera unit 10 can be positively and easily connected to the monitor device.

The central portion 34c of the FPC 34 is the deformable portion, and therefore even if the connector 33 is moved in the surficial direction of the board 32 at the time of connecting the connector 33 to the camera unit 10, the central portion (deformable portion) 34c is suitably deformed, thereby preventing a load from acting on that portion of the FPC 34 connected to the connector 33.

Therefore, the connection between the FPC 34 and the connector 33 is prevented from becoming unstable, and of course, the connection between the FPC 34 and the connector 33 is prevented from being broken.

The potting material 41 filled in the lower case 9 prevents water from intruding into the interior of the coupled cases 8 and 9 from the exterior. Therefore, the camera unit 10 is prevented from a malfunction.

In the above embodiment, although the FPC 34 is used as the connecting member, any other suitable connecting member such as a known FPC and a known bus bar can be used.

The above embodiment merely shows a representative form of the present invention, and the invention is not limited to the above embodiment. Namely, various modifications can be made without departing from the subject matter of the present invention.

What is claimed is:

1. An electric apparatus module comprising:
    an upper case;
    a lower case assembled with the upper case and having an opening;
    an electric apparatus unit accommodated in the upper case and the lower case;
    a connection unit including a board, a connector mounted on the board and connected to the electric apparatus unit, and a connecting member, a first end of the connecting member attached to the board and a second end of the connecting member guided to outside of the lower case through the opening; and
    an assembling portion provided on the connection unit and the lower case and assembling the connection unit to the lower case, the assembling portion enabling the board to move along surficial direction of the board and restricting the board to move in a direction perpendicular to the surface of the board.

2. The electric apparatus module according to claim 1, wherein the assembling portion comprises:
    a through hole provided on the board; and
    a boss provided on the lower case and including a detent which is engaged with the board, a holding portion coming into intimate contact with the board and sandwiching the board with the detent, and a small diameter portion provided between the detent and the holding portion and having a diameter smaller than the diameter of the through hole.

3. The electric apparatus module according to claim 2, wherein the connecting member has a flexible portion provided at a center between the first end and the second end of the connecting member.

4. The electric apparatus module according to claim 2, wherein the lower case is filled with a potting material so as to prevent a liquid from intruding into the upper case and the lower case.

5. The electric apparatus module according to claim 2, the small diameter portion has a length substantially equal to the thickness of the board.

6. The electric apparatus module according to claim 2, wherein the boss has a slit through the detent and the small diameter portion.

7. The electric apparatus module according to claim 1, wherein the connecting member has a deformable portion provided between the first end and the second end of the connecting member.

8. The electric apparatus module according to claim 7, wherein the lower case is filled with a potting material so as to prevent a liquid from intruding into the upper case and the lower case.

9. The electric apparatus module according to claim 1, wherein the lower case is filled with a potting material so as to prevent a liquid from intruding into the upper case and the lower case.

* * * * *